UNITED STATES PATENT OFFICE.

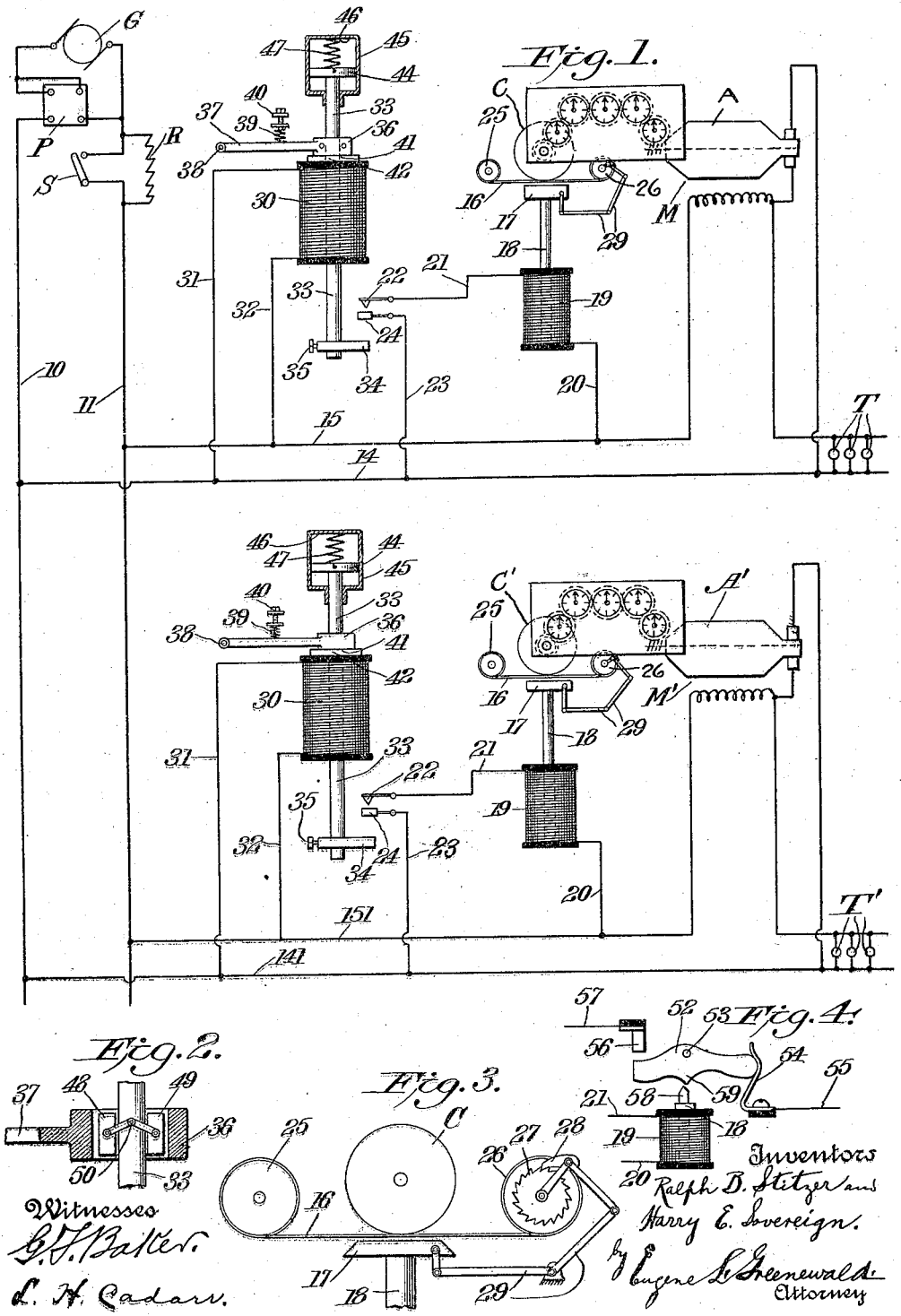

RALPH B. STITZER AND HARRY E. SOVEREIGN, OF BROOKLYN, NEW YORK.

METERING SYSTEM.

1,299,632.  Specification of Letters Patent.  Patented Apr. 8, 1919.

Application filed May 7, 1914. Serial No. 837,004.

*To all whom it may concern:*

Be it known that we, RALPH B. STITZER and HARRY E. SOVEREIGN, citizens of the United States of America, and residents of Brooklyn, Kings county, State of New York, have invented certain new and useful Improvements in Metering Systems, of which the following is a specification.

Our invention relates to metering systems and the like, and has particular reference to an electric metering system. In order to provide a check on the central station output, it is desirable to have the total of the consumers' meters and station meter or meters substantially correspond, the various losses occurring on the distribution system being taken into consideration in the calculations.

The principal object of our invention is therefore to provide a combination of devices which will enable the reading of the consumers' meters and the supply station meter or meters at substantially the same instant.

Another object is to provide means whereby in an electric distribution system the customers' meters may be simultaneously read without increasing the number of conductors over those usually required to supply the current.

Another object is to provide a system whereby it is possible from a generator station or central point to direct the operation of switches or other devices at the consumers' stations over the feeder wires supplying current to said consumers.

The above and other objects and the novel features of our invention will be apparent from the following description, taken in connection with the drawings, in which:

Figure 1 is a diagrammatic representation of our invention as applied to a single feeder circuit of an electric distribution system.

Fig. 2 is a cross-sectional view of a conventional form of clutch employed.

Fig. 3 is an enlarged detail view of the strip feeding mechanism.

Fig. 4 is an enlarged detail showing the application of the invention to circuit controlling or switch mechanism.

Referring to the drawing, G represents the generator which is connected with the feeder circuit comprising the mains 10 and 11. The feeder circuits, of which there may be any suitable number depending on the capacity of the source of supply, are each connected to a number of pairs of service mains 14, 15; 141, 151; etc., leading to the metering devices M, M', etc., which are of the integrating type, and from thence to the translating devices T, T', etc., all of which devices are located at the consumers' stations.

Connected with the spindle of the armature A of each meter is a cyclometer counting gear or other suitable registering or integrating mechanism which may be read directly from a dial if desired. Counter wheels or gears C of any approved type are suitably connected or geared to the cyclometer counting gear or meter gear train and are located above or adjacent a strip of transfer ribbon and a record strip 16.

The printing type on the counter gears C is presented to the strips 16 and in line with the platen 17 mounted on and movable with the plunger 18 of a secondary magnet 19. One terminal of the winding of the magnet 19 is directly connected by the wire 20 to the service main 15. The other terminal of the winding of the magnet 19 is connected by the wire 21 to a stationary switch contact 22. The wire 23 connects the other service main with a spring switch contact 24, which latter automatically restores to open position and normally tends to stand open and out of contact with the switch contact 22. When the contacts 22 and 24 are connected together, it will be apparent that the secondary magnet 19 is energized which causes the plunger 18 and platen 17 to move upward to obtain an impression of the meter reading on the record strip. When the magnet 19 is deënergized by the opening of the contacts 22, 24, the platen 17 and plunger 18 automatically restore by gravity to their normal lowered position. The record and transfer strips 16 are drawn from a supply spool 25 and wound onto a receiving spool 26, which latter may be located within a locked casing (not shown) so that the record will be inaccessible except to authorized persons. The casing may have a transparent portion so that the recorded reading may be read without opening the casing.

A ratchet wheel 27 on the spindle of the spool 26 may be operated by a pawl 28 connected by linkage and a bell crank lever 29 with the platen or plunger so that each time the secondary magnet 19 is deënergized or after each automatic reading, the record strip will be fed a suitable amount to provide blank space for the succeeding reading.

The mechanism for closing the switch contacts 22, 24 includes a primary electromagnet 30 which has its winding permanently connected in shunt to the service mains 14 and 15 by the wires 31 and 32 respectively.

A rod 33 of non-magnetic material such as brass passes centrally through the magnet 30 and carries a collar 34 at its lower end which collar is adjustable along the rod 33 and secured in place thereon by a thumb screw 35. The collar 34 is adjusted in such a position on the rod 33 and in such a relation to the contacts 22, 24, that after a predetermined movement of the rod it will move the spring contact 24 upwardly and close the circuit of the secondary magnet 19.

The device for raising the rod 33 consists of a clutch 36 engaging the rod and mounted at the free end of a clutch lever 37 pivoted at 38. A spring 39 is connected at one end to the lever 37 and at its opposite end to an adjusting screw 40 and normally tends to raise the free end of the lever 37 carrying the clutch 36 which engages the rod 33. The clutch body 36 constitutes the armature of the electromagnet 30 and has a face 41 which normally rests on the upper end 42 of the magnet 30. The magnet 30 is energized at all times while current is flowing, and the spring 39 is so adjusted that the clutch and armature will be held in contact with the plate 42 while the voltage of the supply mains remains at its normal or working value or rises above the same. The spring 39 will however overcome the attraction of the armature by the magnet 30 when the voltage of the supply decreases a predetermined amount, say 10%, and the clutch will then rise carrying the rod 33 with it.

In order to avoid the operation of the recording mechanism at each momentary decrease in voltage on the system or by accident, the collar 34 on the rod 33 is adjusted so that it will require several operations of the clutch as above described before the spring contact 24 is reached and closed to energize the magnet 19.

In order to obtain a predetermined number of regular low-voltage kicks or impulses for weakening the shunt or primary coil 30, a resistance R normally in shunt with the main 11 is momentarily inserted in series with the main 11 and is of sufficient ohmage to reduce the voltage of the feeder circuit about 10%, so that the clutches of all primary magnets will operate. The resistance R is preferably located at the central station or some central controlling point and may be inserted momentarily a number of times in rapid succession by opening and closing a switch S, which is normally closed and may be operated manually or may be rotated by some suitable auxiliary motor or device to open and close the switch at a predetermined rate to produce regular impulses to direct the operation of the mechanism.

The upper end of the rod 33 carries a piston 44 which fits in a dash pot cylinder 45 and is also connected to the upper end 46 of the cylinder 45 by means of a spring 47. It will be seen that the rod 33 and the collar 34 are designed to restore to normal position by gravity and the purpose of the dash pot arrangement and spring 47 is to retard the downward movement of the parts so that the collar 34 and rod 33 will not immediately return to their normal positions after each impulse and complete operation of the clutch 36.

The insertion of the resistance R causes the weakening of the magnet 30 and release of the clutch, which lifts the rod 33 a slight amount. As it requires several such lifts to bring the collar 34 into a position to close the circuit of the secondary magnet 19, there must be several impulses. The impulse device or switch S is then closed to cut out the resistance R and strengthens the force of the shunt coil sufficiently to draw the clutch armature against the tension of the spring 39. On its down stroke the pivoted clutching members 48 and 49 of the clutch release the rod 33 and the latter will be prevented or greatly retarded in lowering by the dashpot 45 and spring 47. By repeating the opening and closing of the switch S the desired number of times, the circuit of the secondary magnet may be closed to operate the printing or recording mechanism. In order to quickly restore the voltage to the normal or working value after each impulse is sent by the impulse sending means, a feeder potential regulator P, such as is usually employed for maintaining the voltage at a predetermined value, is located in the feeder circuit in advance of the impulse producing means.

It is to be understood that each meter is equipped with a primary coil 30 and secondary coil 19 including their parts and that the potential regulator, impulse producing means as well as a station meter on the feeder circuit for recording the combined feeder output are preferably located at the central station.

If the circuit has been opened at any point the clutch grips the rod 33 and lifts the same only an amount equivalent to that caused by one impulse. When the circuit is closed the magnet 30 pulls the lever 37 and clutch 36 back to their original position and the dashpot permits the gradual return by gravity of the rod 33 and switch operating member 34 to their initial position.

When the station attendant wishes to simultaneously take meter records at the station and on the feeder circuit he produces a series of low voltage impulses by introducing the resistance R into the circuit at regular intervals causing the primary magnet 30 to let go of the clutch 36 the required number of times to close the circuit of the secondary magnet 19. The secondary magnet operates the recording mechanism as heretofore explained and immediately thereafter restores to its initial position since the required number of impulses to raise the collar 34 to close the switch contacts 22, 24, having been transmitted from the central station, the member 34 will immediately restore by gravity and the secondary circuit will be opened. However, in some cases, the member 34 may be held up longer on the last impulse so as to maintain the secondary circuit energized for a longer period.

The secondary circuit may be used for other purposes such as energizing a magnet which closes a motor start-switch or opens said motor circuit, operating meters for two-rate electric sales, setting standard time in customers' houses, etc.

The invention is also capable of use in connection with gas meters, in recording readings and closing and openings valves of service mains. Each gas meter may be equipped with a primary and secondary magnet, and associated devices, as in the electric meter, the magnets being connected to the service mains leading to the electric meter. By such an arrangement the gas meters and electric meters may be read simultaneously and from the same central point or station. Such a system is particularly applicable where the same company operates both utilities. It also eliminates the necessity of having trained meter readers.

In Fig. 4 is shown a diagram indicating how the plunger of the secondary magnet 19 may be connected so that the first movement of the same will open a switch and the next movement will close the switch. The switch member 52 is pivoted at 53 and is permanently located in contact with the spring contact 54 connected to the wire 55. By rocking the switch member 52 on its pivot the wire 55 is alternately electrically connected with and disconnected from the contact 56 to which the wire 57 is connected. The plunger 18 of the secondary magnet 19 has a projection 58 at its end which alternately engages at the opposite sides of the V-shaped projection 59 on the switch member to rock the same as will be readily understood, said projection being free to move laterally a slight amount to perform its function. Thus, as the secondary magnet 19 is energized, and the plunger 18 operates, the switch will be alternately closed and opened after each group of impulses. Such a switch may be applied in cutting "off-peak" loads onto and from a circuit. Up to the present the only satisfactory means for assuring that "off-peak" loads would be connected only during "off-peak" periods was to provide a separate supply circuit for such customers. The present arrangement eliminates the extra circuit, the switch on the service wires as shown in Fig. 4 being, as is the meter mechanism, located in a casing and inaccessible to the customer and controlled at will from the central station.

By adjusting the devices and by varying the speed with which the switch operating element 34 returns to its initial position, and the speed and number of low voltage kicks or impulses, one class of impulses may be used to read the meters, and another class for opening all "off-peak" customers' circuits and closing them again. A switch operating mechanism as well as a meter reading mechanism may be located on the same service wire and at the same consumers' premises.

Our invention for controlling apparatus over the feeder circuits of electric lighting systems has the practical advantages that it does not require extra conductors or breaking of feeder circuits and therefore does not interfere with the lighting load. The same mains that carry the current supply transmit the impulses to the devices at the customers' stations which are tuned to respond to such variations or impulses.

While we have shown and described our invention in detail, we do not wish to be limited to the exact construction shown as numerous changes in details are possible without departing from the spirit of the invention.

What we claim is:

1. In an electrical system, the combination of a source of current, a main circuit connected thereto, a device adapted to be energized from said main circuit, means for controlling the circuit of said device, means whereby the voltage on said main circuit may be momentarily varied, electro-responsive means connected to said main circuit and adapted to operate said circuit controlling means, said electro-responsive means being arranged to cause the closure of the circuit of said device only when the voltage of the main circuit is weakened and strengthened a plurality of times in quick succession.

2. In an electrical system, the combination of a source of current, a main circuit leading therefrom, a device adapted to be energized from said main circuit, means for controlling the circuit of said device, means whereby the voltage of said main circuit may be momentarily varied, electro-responsive means connected to said main circuit and adapted to operate said circuit controlling means, said electro-responsive means being arranged to close the circuit of said device at said circuit controlling means when weakened and strengthened a plurality of times in quick succession and to open the circuit at said controlling means when fully energized for a predetermined interval.

3. A system as set forth in claim 2, in which the electro-responsive means comprises a clutch mechanism.

4. In an electrical system, the combination with a source of current and feed wires leading therefrom, of an electrical translating device adapted to be connected to said wires to receive energizing current from said source, means whereby the voltage of said current may be varied a plurality of times in succession to produce a series of impulses transmitted over said feed wires, and means connected to be affected by said impulses and rendered effective only by a series of impulses in quick succession to cause a single operation of said translating device.

5. An electrical system comprising a source of current, an electric supply circuit connected therewith, a circuit comprising a translating device and a switch controlling the connection of the same to said supply circuit, means controlling the operation of said switch comprising an electro-responsive device connected to said supply circuit, and means whereby a group of impulses in quick succession may be transmitted to said responsive device to cause a single complete operation of said switch controlling means, a single impulse being incapable of causing the operation of said switch controlling means to actuate said switch.

6. An electric distribution system comprising a source of current for translating devices, a feeder circuit connected therewith, a consumer's circuit connected to said feeder circuit, an electric circuit, a switch controlling said electric circuit, and means controlling said switch comprising an electric device connected to said consumer's circuit, and means whereby the potential of the current supplied by said source may be varied a plurality of times in succession to produce impulses in said feeder circuit, said switch controlling means being incapable of a complete operation by a single impulse.

7. The combination with a measuring device, of a recording mechanism associated therewith, electric actuating means for said recording mechanism, an electric circuit connected with said actuating means, and means whereby a plurality of successive impulses may be produced in said circuit to control said actuating means, said actuating means being incapable of operation on a single impulse.

8. In a system of the class described, the combination of a common electric current supply station, mechanisms located at individual consumers' premises and supplied with electric current from said common supply station, an electro-responsive device associated with and coöperating with each of said mechanisms, and means located at the supply station whereby the voltage of the current may be varied a plurality of times in quick succession to produce a series of impulses for causing the operation of the responsive devices.

9. In a system of the class described, the combination of a common electric current supply station, a main circuit leading therefrom, branch circuits connected with said main circuit and leading to consumers' premises, a primary magnet in shunt with each of said branch circuits and responsive to variations of the potential of the supply current in said main circuit, a secondary magnet having its circuit controlled by said primary magnet, an operating element actuated by said secondary magnet, and means whereby the potential of the supply current flowing in said main circuit may be varied a plurality of times in succession to control the action of said primary magnet.

10. In a metering system, the combination of a generator, a feeder circuit connected thereto, service mains connected with said feeder circuit, an electric meter of the integrating type connected with said service mains, recording means associated with the meter, an operating element coöperating with said recording means, a normally deenergized secondary magnet for actuating said operating element, a primary magnet permanently connected with said main and responsive to low-voltage impulses, means normally inactive but rendered active and operative when said primary magnet responds to impulses and arranged to cause the energization of the secondary magnet, means whereby impulses may be produced in succession and a potential regulator in the feeder circuit and located between the generator and said impulse producing means.

11. The method of simultaneously operating a plurality of independent electrically operated mechanisms which comprises transmitting a series of distinct impulses to electro-responsive operating means associated with said mechanisms by altering the normal condition of said electro-responsive means a plurality of times in quick succession, corresponding in number to the plurality of impulses transmitted.

12. The combination with an electric actuating means, of a circuit including said actuating means, a switch in said circuit, and an electro-responsive device for operating said switch, and means whereby a plurality of impulses may be transmitted to said electro-responsive device, said device being adapted to operate said switch only after more than one impulse has been transmitted thereto.

In testimony whereof we affix our signatures in presence of two witnesses.

RALPH B. STITZER.
HARRY E. SOVEREIGN.

Witnesses:
ARTHUR C. PRESTON,
ERNEST R. WEINMANN.